United States Patent
Feltrin

(10) Patent No.: US 9,027,439 B2
(45) Date of Patent: May 12, 2015

(54) CRANK ARM

(71) Applicant: Tien Hsin Industries Co., Ltd., Taichung (TW)

(72) Inventor: Sandro Feltrin, Conegliano (IT)

(73) Assignee: Tien Hsin Industries Co., Ltd., Taichung (TW)

( * ) Notice: Subject to any disclaimer, the term of this patent is extended or adjusted under 35 U.S.C. 154(b) by 2 days.

(21) Appl. No.: 13/936,320

(22) Filed: Jul. 8, 2013

(65) Prior Publication Data

US 2015/0007688 A1      Jan. 8, 2015

(51) Int. Cl.
*B62M 3/00* (2006.01)

(52) U.S. Cl.
CPC ............... *B62M 3/00* (2013.01); *Y10T 74/2164* (2015.01)

(58) Field of Classification Search
USPC .............................................. 74/594.1–594.3
See application file for complete search history.

(56) References Cited

U.S. PATENT DOCUMENTS

| | | | | |
|---|---|---|---|---|
| 4,550,927 A | * | 11/1985 | Resele ...................... | 280/281.1 |
| 5,165,306 A | * | 11/1992 | Hellon ........................... | 74/588 |
| 5,769,442 A | * | 6/1998 | Robinson et al. .......... | 280/281.1 |
| 5,913,529 A | * | 6/1999 | Patterson ................... | 280/281.1 |
| 2004/0200314 A1 | * | 10/2004 | Hermansen et al. ......... | 74/594.1 |

FOREIGN PATENT DOCUMENTS

TW            431405          4/2001

* cited by examiner

*Primary Examiner* — Vicky Johnson
(74) *Attorney, Agent, or Firm* — WPAT, PC; Justin King

(57) ABSTRACT

A crank arm is provided, which includes a first connecting member and a second connecting member used for joining the first connecting member. The first connecting member has a first wall surface, the first wall surface is provided with a joint wall of an annular structure, and a wall surface of the joint wall is a concave-convex surface. The second connecting member is provided with a second wall surface opposite to the first wall surface, an annular wall and two facing ribs extend from the second wall surface, and the annular wall and the ribs have a groove there-between for fitting the joint wall therein. Therefore, a contact area of the first connecting member and the second connecting member is increased, and a shear force resisting function is provided.

8 Claims, 10 Drawing Sheets

CRANK ARM

BACKGROUND OF THE INVENTION

1. Field of the Invention

The invention generally relates to a crank arm, and in particular, to a bicycle crank arm with an increased contact area and having a shear force resisting function.

2. Related Art

A crank arm is provided on a bicycle and is mainly for transmitting the the rider's stepping force into a driving force to drive the bicycle move forward, so the crank arm must have enough strength to resist the shear force derived during the pedaling. Therefore, for a conventional bicycle crank arm, metal material is the first choice to make a crude unfinished product through casting and then surface processing and treatment are performed. However, as industrial technologies develop, bicycle parts are required to be lighter in weight, and much safer during a violent ride. Gradually, choosing aluminum alloy or composite metal material as the material to produce a crank arm becomes a tendency. Even though there are many forging methods used for processing an interior of the crank arm to make the crank arm hollow, thereby achieving the purpose of reducing weight. However, to manufacture a hollow crank arm through forging methods is troublesome and time-consuming and now becomes outdated for a long time ago.

In public patent applications, such as a Taiwan patent application "Bicycle Crank Arm Structure", the patent publication number of which is 431405. A crank body 1 and a cover plate 2 integrally formed by adopting an aluminum alloy are disclosed. The crank body 1 has a head and a tail opposite to each other in a longitudinal direction, and a sleeve joint hole 3 opened at the head for locking a through tube of a bicycle. An opening part 4 is formed on a rear bent part adjacent to the head on the crank body 1, and a slot hole 5 is formed inside the crank body 1. One end of the slot hole 5 is a closed end, and the other end of the slot hole 5 communicates with the opening part 4. At least one reinforcing rib 6 is provided inside the slot hole 5 to enhance the strength of the crank arm. The cover plate 2 is welded or fixedly covered to the opening part 4, so that the crank body 1 is hollow, thereby achieving the objectives of reducing the weight and lowering the cost.

However, it is difficult to dig the slot hole 5 inside the crank body 1. In particular, the slot hole 5 has a plurality of reinforcing ribs 6 therein, so that a space for processing in the slot hole 5 is rather small, and operations are difficult. After the slot hole 5 is formed through processing, the cover plate 2 must be sealed over the opening part 4 in a welding manner, which is very troublesome and time consuming.

SUMMARY OF THE INVENTION

The main objective of the present invention is to provide a crank arm provided with a light weight and a satisfying strength and can be assembled rapidly.

To achieve the above objective, the present invention is directed to a crank arm, which comprises a first connecting member and a second connecting member that compactly joins the first connecting member. The first connecting member has a first wall surface, two ends of the first wall surface along a longitudinal direction are respectively defined as a first pivot end and a first drive end, and the first pivot end is provided with a first axle hole therethrough. A joint wall is formed at the first wall surface and extended from the first wall surface toward the second connecting member, and a wall surface of the joint wall is a concave-convex surface. The second connecting member is provided with a second wall surface opposite to the first wall surface, and two ends of the second wall surface along a longitudinal direction are respectively defined as a second pivot end and a second drive end. The second wall surface has a second axle hole for joining the first axle hole and a groove provided on the second wall surface and for fitting the joint wall therein.

Further, the wall surface of the joint wall may have a wave shape, a serration shape or a square wave shape.

Further, the joint wall has a continuous annular structure.

Further, the second wall surface has an annular wall extending toward the first connecting member and pressing against the first wall surface, the annular wall is formed on the periphery of the second wall surface, so that the second connecting member forms a frame trough configuration, inner sides of the annular wall are provided with two ribs respectively, and the groove is formed between the annular wall and the ribs.

Further, the first wall surface is provided with at least one reinforcing rib opposite to the ribs along a longitudinal direction and extending from the first wall surface toward the second connecting member, and the reinforcing rib is positioned on an inner side of the joint wall.

Further, the first wall surface is provided with a first axle seat that extends from the first wall surface toward the second connecting member, and the first axle hole is opened at the center of the first axle seat. A partition is provided on the periphery of the first axle seat, and two ends of the partition are adjacent to the joint wall. The second pivot end is provided with a second axle seat, and the second axle hole is opened at the center of the second axle seat.

Further, the first drive end is provided with a first hole seat, and a first assembly hole is opened at the center of the first hole seat. The second drive end is provided with a second hole seat that engages with the first hole seat, and a second assembly hole is opened at the center of the second hole seat.

Further, the first wall surface is provided with at least one first convex rib that extends toward the second connecting member, the second wall surface is provided with at least one second convex rib that extends toward the first connecting member, and the first convex rib joins two opposite wall surfaces of the second convex rib.

In this arrangement, since the joint wall has the concave-convex surface and the wall surfaces of the annular wall and the ribs, which match with the joint wall, are also concave-convex surfaces, the contact area between the joint wall and the annular wall and the ribs is increased, which can effectively disperse the shear force caused by stepping in a riding process over the increased area. Because the concave-convex surface can effectively withstand stresses of different directions through directly absorb the stress vertical to the concave-convex surface produced by cyclic stepping, less shear forces are produced, thereby enhancing the joining strength of the two joining surfaces and prolonging the life time of the joining surfaces. In addition, because the joint wall, the annular wall, and the ribs have contact surfaces fitting each other in a concave and convex manner, when a rider steps on a pedal and changes a stress angle of the crank arm, slipping between the first connecting member and the second connecting member can be avoided, and a braking and positioning function is provided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
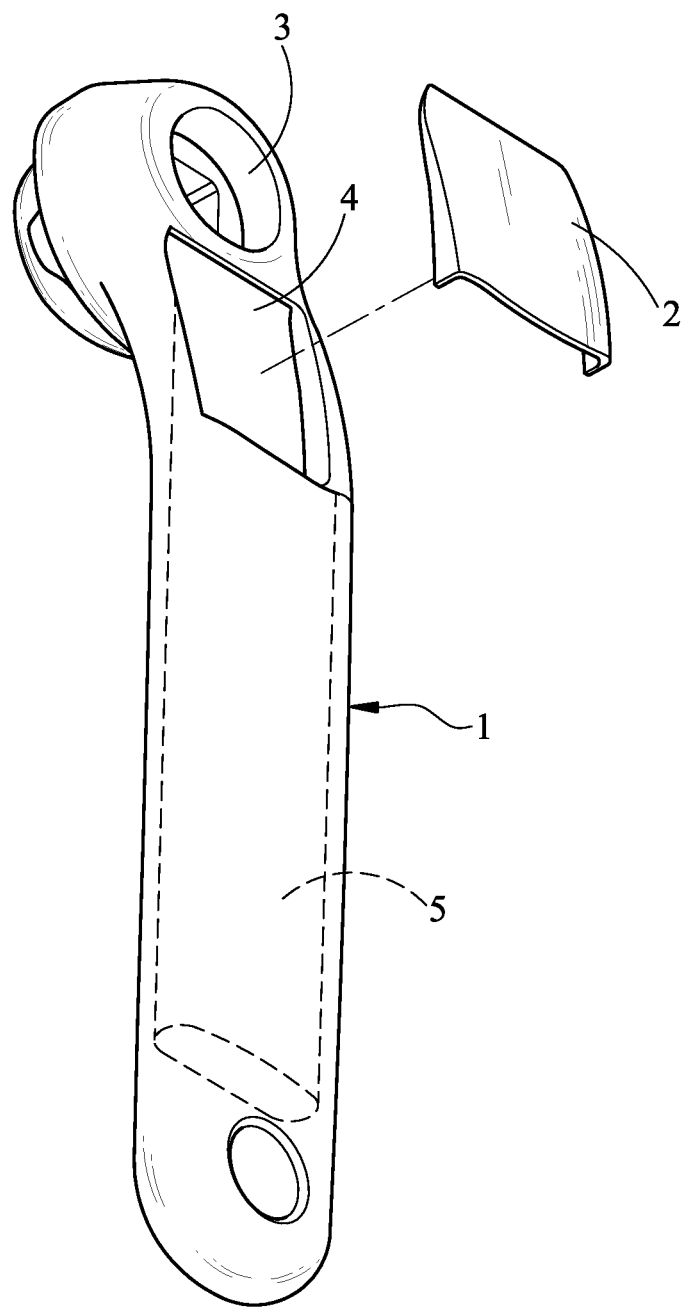
FIG. 1 is a schematic three-dimensional diagram of a bicycle crank structure in the prior art.
Figure 2:
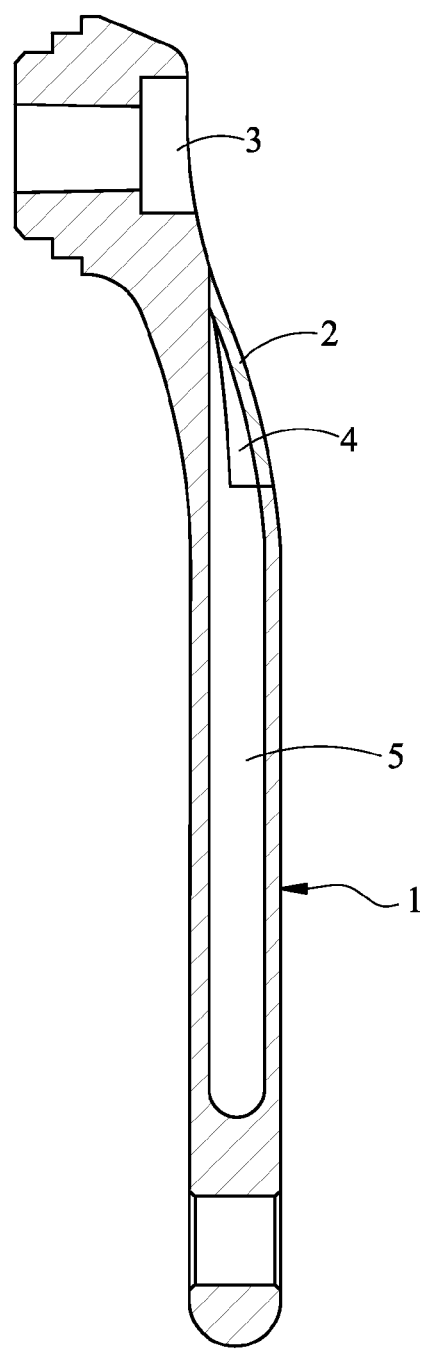
FIG. 2 is a longitudinal sectional diagram of a bicycle crank structure in the prior art.
Figure 3:
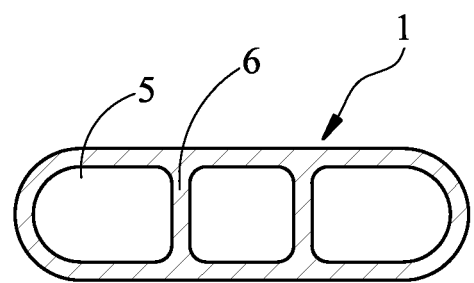
FIG. 3 is a transverse sectional diagram of a bicycle crank structure in the prior art.

For detailed description and technical illustration of the present invention, further illustration is made through an embodiment. However, it should be understood that the embodiment is only intended for illustration and should not be explained as a limit of the embodiment of the present invention.

Referring to FIG. 4 to FIG. 7, a crank arm of the present invention includes a first connecting member 10 and a second connecting member 20 used for closely joining the first connecting member 10.

The first connecting member 10 has a first wall surface 11, two ends of the first wall surface 11 along a longitudinal direction respectively have a first pivot end 12 and a first drive end 13, and the first pivot end 12 is provided with a first axle hole 14 there-through. The first wall surface 11 is provided with a joint wall 15 that extends from the first wall surface 11 toward the second connecting member 20 and has a continuous annular structure. A wall surface of the joint wall 15 is a wave-shaped concave-convex surface, and the joint wall 15 is provided along a contour shape of the first wall surface 11, so that the first connecting member 10 forms a frame trough configuration. In this embodiment, the first wall surface 11 is provided with a first axle seat 16, and the first axle hole 14 is opened at the center of the first axle seat 16. A partition 17 is provided on the periphery of the first axle seat 16, two ends of the partition 17 are adjacent to the joint wall 15, and the partition 17 has an arc shape. The first wall surface 11 is provided with a reinforcing rib 18 along a longitudinal direction, and the reinforcing rib 18 extends from the first wall surface 11 toward the second connecting member 20 and is positioned on an inner side surface of the joint wall 15. The first drive end 13 is provided with a first hole seat 19, and a first assembly hole 191 is provided at the center of the first hole seat 19. Moreover, the first wall surface 11 is provided with at least one first convex rib 192 extending toward the second connecting member 20. In this embodiment, two first convex ribs 192 exist, and the two first convex ribs 192 have a narrow gap 193 there-between.

The second connecting member 20 is provided with a second wall surface 21 opposite to the first wall surface 11, and the second wall surface 21 has a second pivot end 22 and a second drive end 23 opposite to each other along a longitudinal direction. The second wall surface 21 has a second axle hole 24 that joins the first axle hole 14 and a groove 25 that extends from the second wall surface 21 toward the first connecting member 10 and fits the joint wall 15, and the groove 25 is provided along a contour of the second wall surface 21. In this embodiment, an external edge of the second wall surface 21 has an annular wall 26 extending toward the first connecting member 10 and compactly pressing against the first wall surface 11. The annular wall 26 is formed on the external edge of the second wall surface 21, so that the second connecting member 20 forms a frame trough configuration. Inner sides of the annular wall 26 are provided with two ribs 27 that extend along a longitudinal direction of the second wall surface 21 and press against the first wall surface 11, the two ribs 27 are provided facing each other, and the groove 25 is defined between the annular wall 26 and the ribs 27. The second wall surface 21 is provided with a second axle seat 28, and the second axle hole 24 is formed at the center of the second axle seat 28. Moreover, the second drive end 23 is provided with a second hole seat 29 that engages with the first hole seat 19, a second assembly hole 291 is opened at the center of the second hole seat 29, and the ribs 27 are connected to the second hole seat 29. Moreover, the second wall surface 21 is provided with at least one second convex rib 292 extending toward the first connecting member 10. During the engagement for the crank arm, the first convex ribs 192 join two opposite wall surfaces of the second convex rib 292, and the second convex rib 292 fits into the narrow gap 193.

Figure 8:
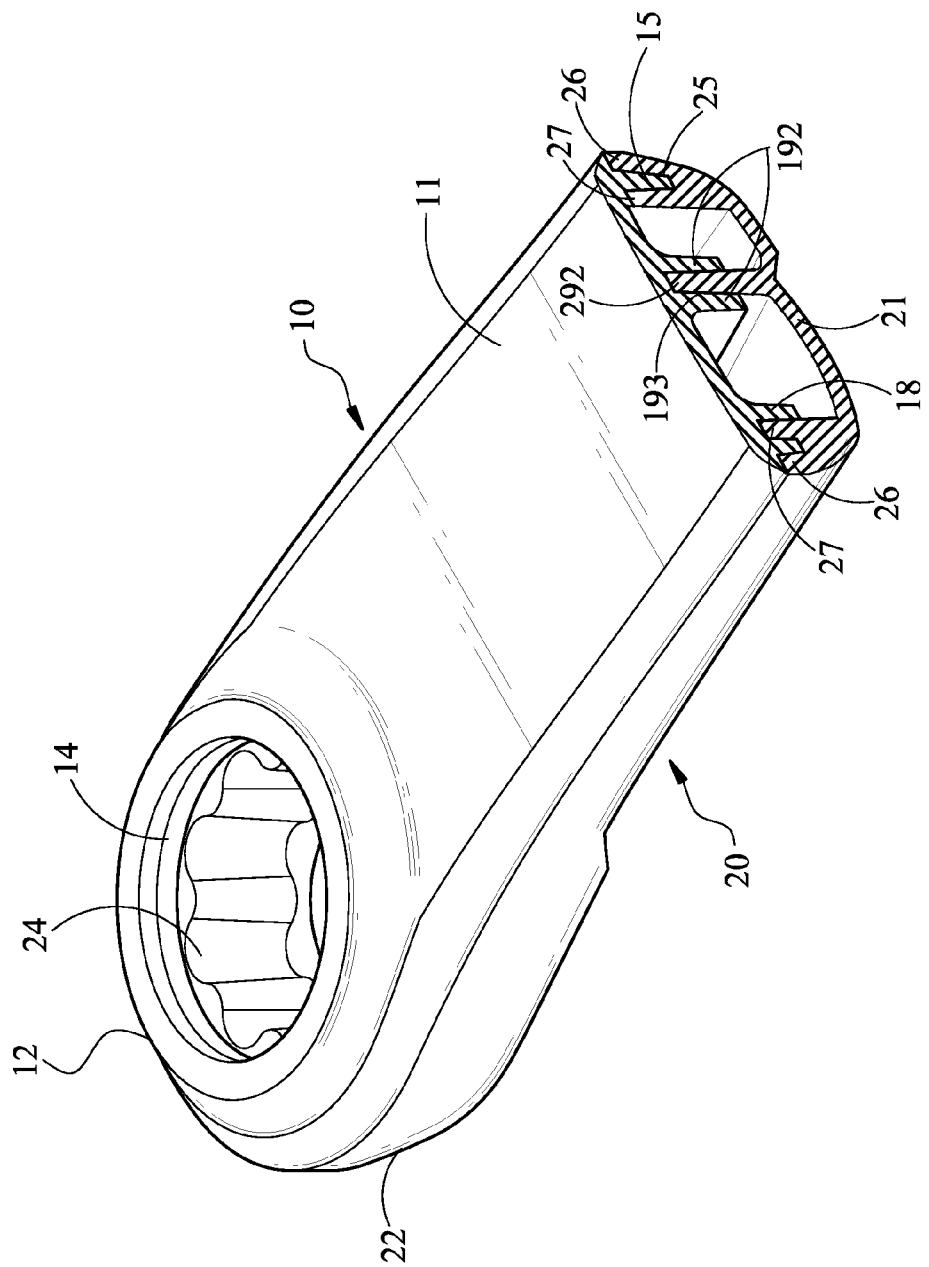
FIG. 8 is a drawing of a combined section plane of the first embodiment of the present invention.

Referring to FIG. 8, when the crank arm of the present invention is assembled, an adhesive is first applied to the joining surfaces of the first connecting member 10 and the second connecting member 20, and then the first connecting member 10 is engaged with the second connecting member 20. The joint wall 15 fits into the groove 25 of the second connecting member 20 in a closely matching manner, and inner wall surfaces of the groove 25, which face each other, just match with outer wall surfaces of the concave-convex surface of the joint wall 15. The second convex rib 292 fits into the narrow gap 193. Finally, the first connecting member 10 and the second connecting member 20 are adhered together by the adhesive.

Figure 4:
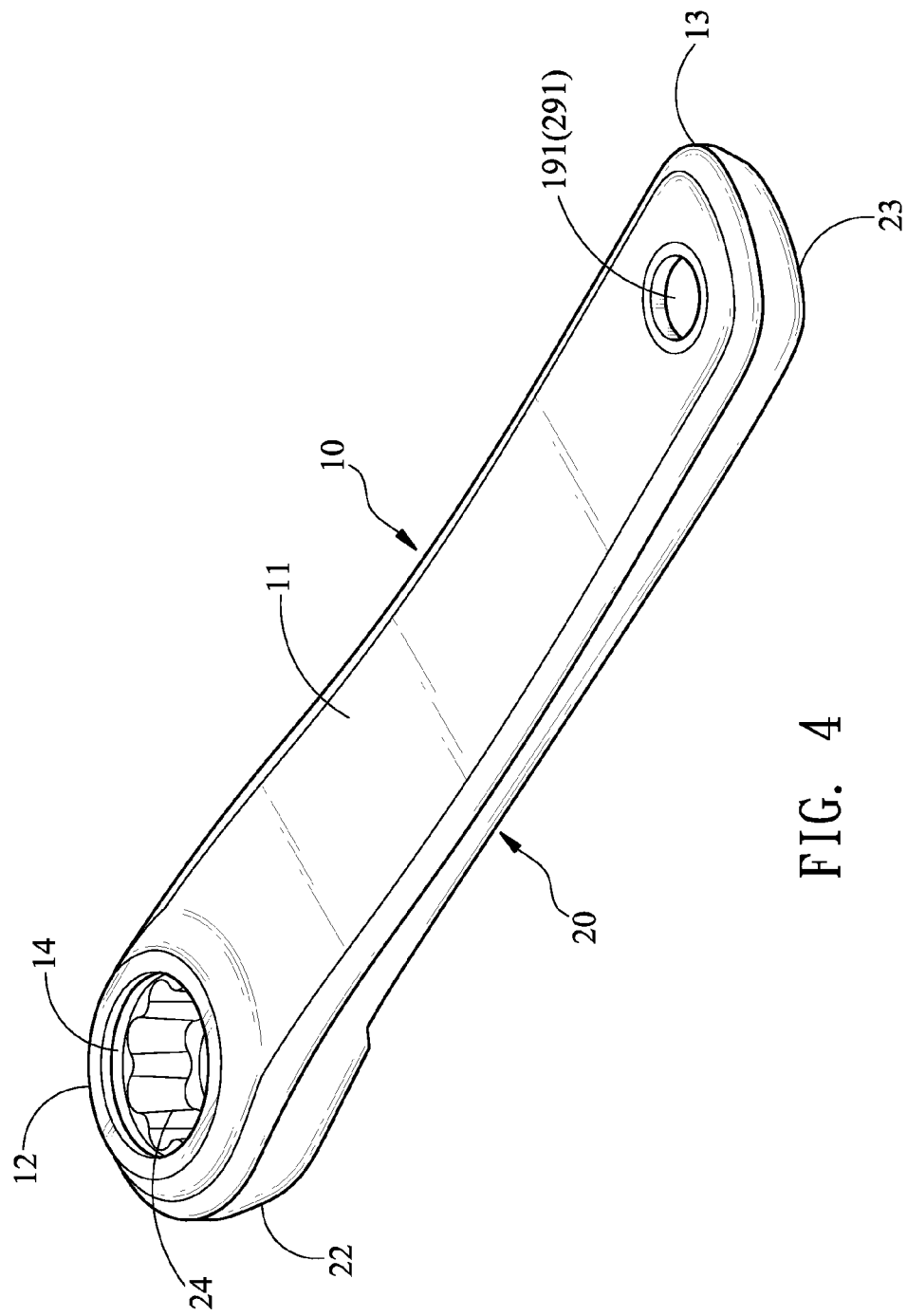
FIG. 4 is a three-dimensional diagram of a combined appearance of a first embodiment of the present invention.
Figure 5:
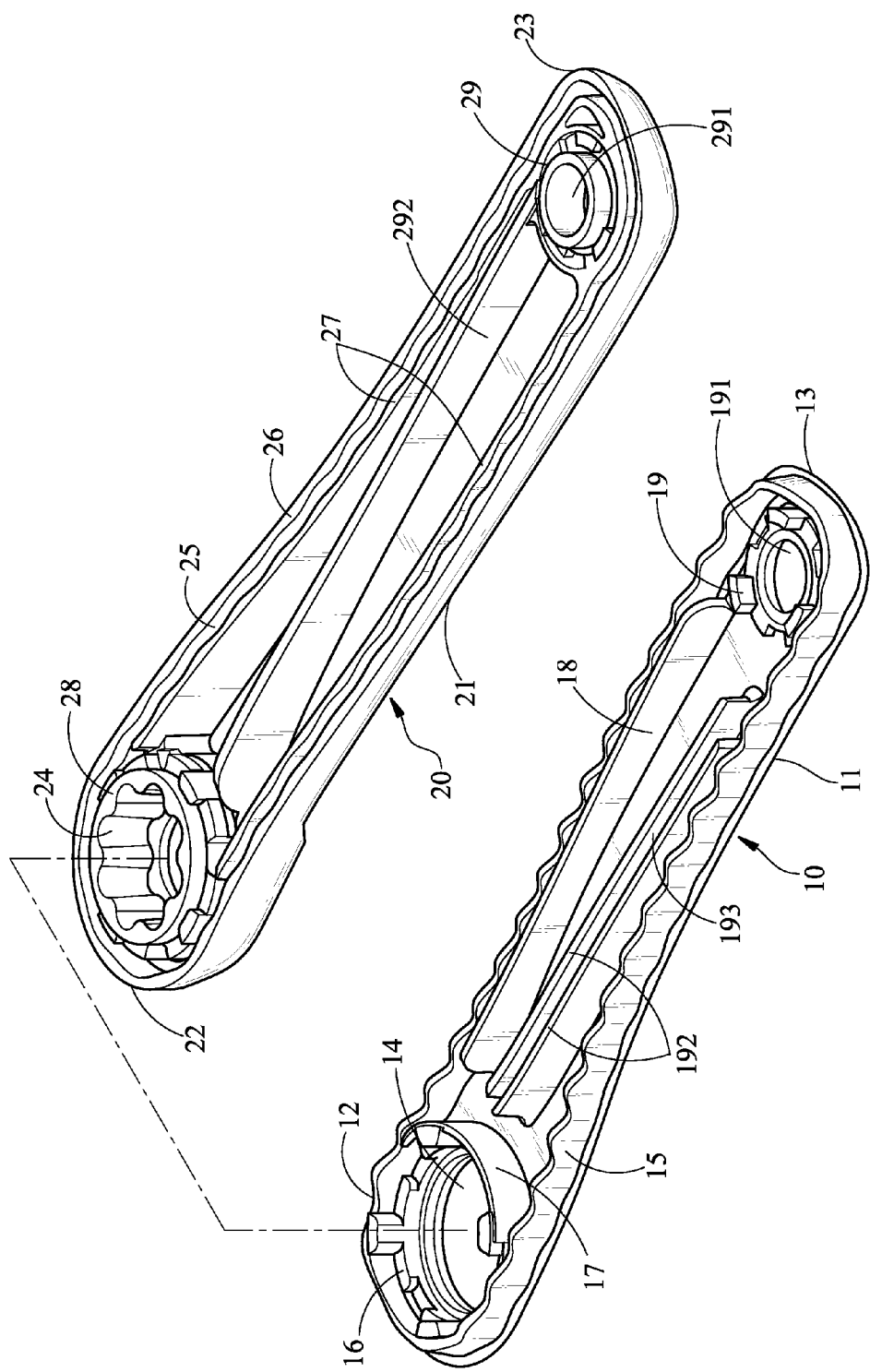
FIG. 5 is a three-dimensional exploded diagram of the first embodiment of the present invention.
Figure 6:
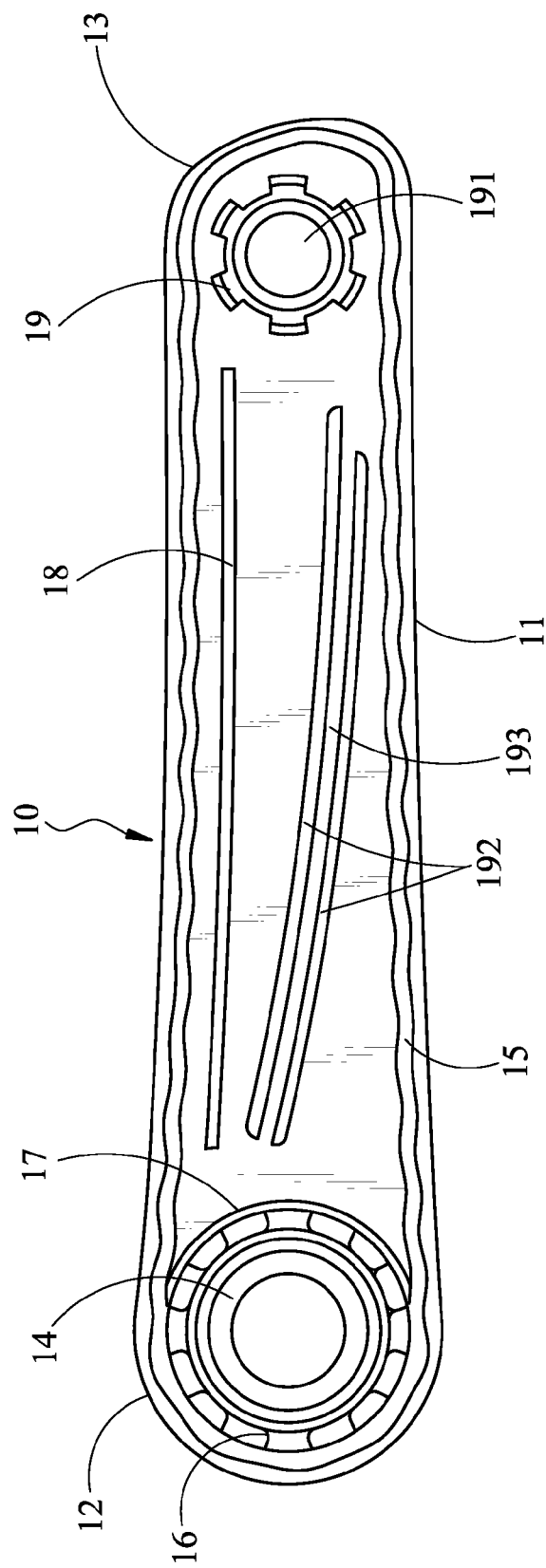
FIG. 6 is a plan diagram of a first connecting member of the first embodiment of the present invention.
Figure 7:
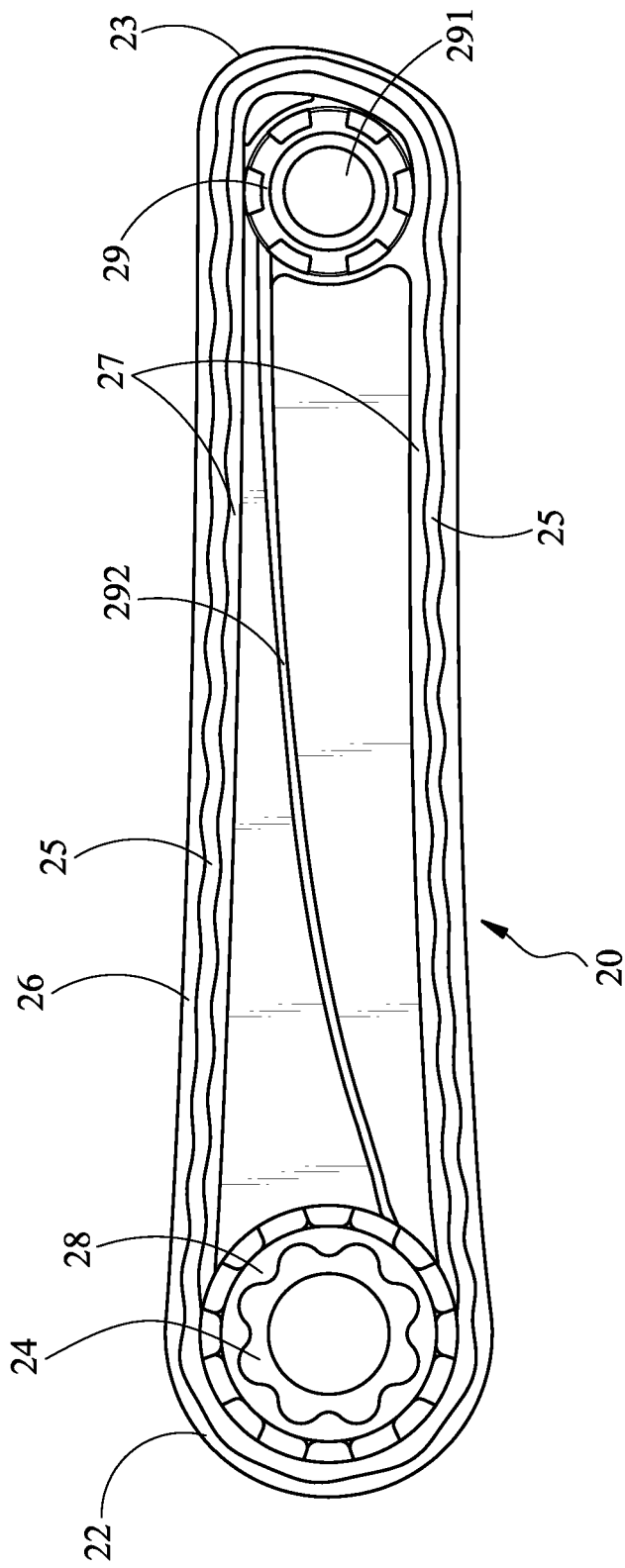
FIG. 7 is a plan diagram of a second connecting member of the first embodiment of the present invention.
Figure 9:
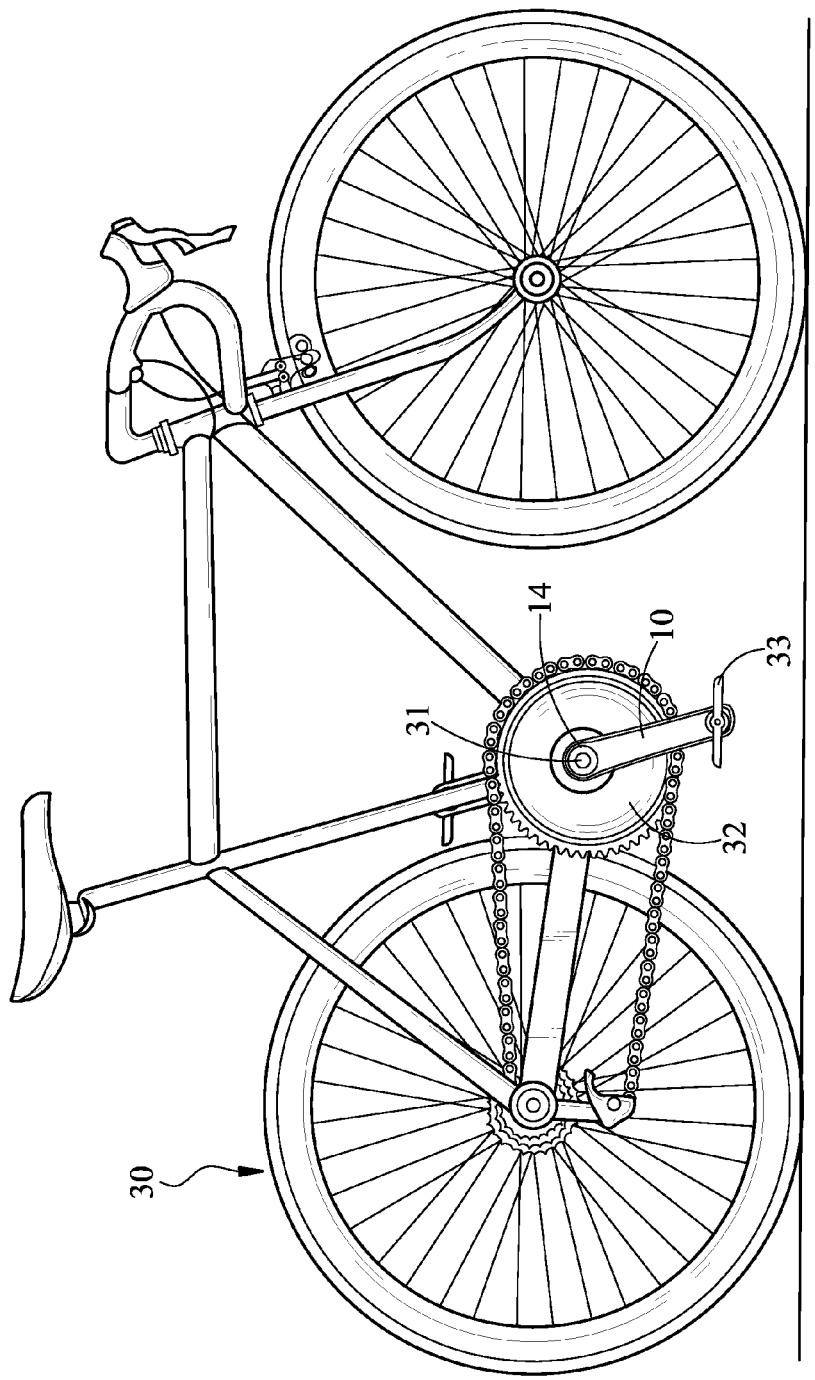
FIG. 9 is a drawing of a bicycle equipped with the present invention.

Further referring to FIG. 4 and FIG. 9, the first axle hole 14 and the second axle hole 24 are provided for an axle rod 31 of a bicycle 30 to pass through, so that the axle rod 31 is set up with a transmission chain sprocket 32. Each end of the axle rod 31 is connected with one crank arm of the present invention, and the first assembly holes 191 and the second assembly holes 291 of the two crank arms are respectively used for spindles of two pedals 33 to pass through.

When a rider steps on the pedals 33, the two crank arms drive the axle rod 31, and the axle rod 31 further drives the transmission chain sprocket 32 to spin. Because angles and stress directions of the two crank arms constantly change as the rider steps on the pedals 33, a shear force is produced between the first connecting member 10 and the second connecting member 20.

Figure 10:
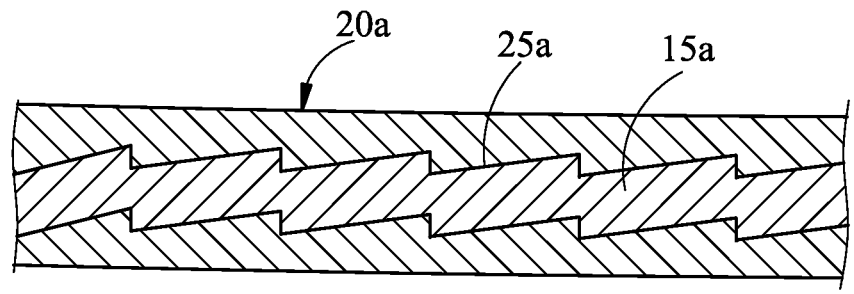
FIG. 10 shows a second embodiment of a joint wall of the present invention.
Figure 11:
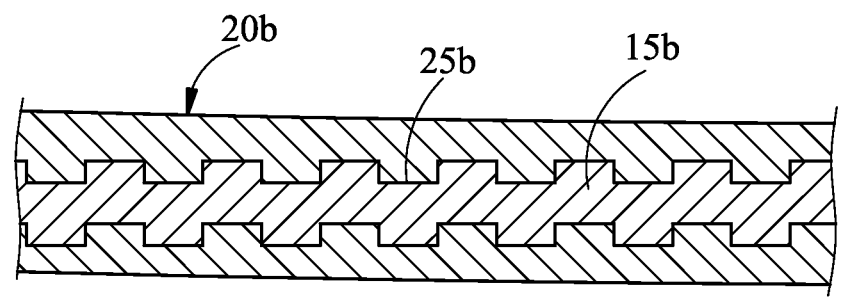
FIG. 11 shows a third embodiment of a joint wall of the present invention.

Referring to FIG. 10 and FIG. 11, FIG. 10 shows a second embodiment provided with a serration shaped concave-convex surface of a joint wall 15a of the present invention, and a second connecting member 20a thereof is provided with a groove 25a for fitting the joint wall 15a therein. FIG. 11 shows a third embodiment provided with square-wave shaped concave-convex surface of a joint wall 15b of the present invention, and a second connecting member 20b thereof is provided with a groove 25b for fitting the joint wall 15b therein.

Because the wall surface of the joint wall 15 of the first embodiment of present invention is a wave-shaped concave-convex surface, wall surfaces of the annular wall 26 and the ribs 27, which fit the joint wall 15, are also wave-shaped concave-convex surfaces, so that a contact area is increased when the joint wall 15 fits the annular wall 26 and the ribs 27, which enhances strengths and a shear force resisting capability of the first connecting member 10 and the second connecting member 20. Because the joint wall 15, the annular wall 26, and the ribs 27 have contact surfaces fitting each other in a concave and convex manner, when the rider steps on the pedals 33 and changes a stress angle of the crank arm, slipping between the first connecting member 10 and the second connecting member 20 can be avoided, and a fixing function is provided.

It should be mentioned that the first connecting member 10 of the first embodiment is also provided with the first convex rib 192 and the second connecting member 20 is provided with the second convex rib 292, which respectively enhance strengths of the first connecting member 10 and the second connecting member 20. The first connecting member 10 is also provided with the reinforcing rib 18. Apart from enhancing the stress strength of the first connecting member 10, the reinforcing rib 18 can also be used to clamp the rib 27 and make the second convex rib 292 to fit into the narrow gap 193, so as to enlarge a joining surface of the first connecting member 10 and the second connecting member 20, thereby achieving stable positioning and enhancing the stress strength.

It can be known from the above implementation manner of the embodiments of present invention that the present invention has the following advantages.

1. By providing the concave-convex surfaces of the joint wall and the groove and adding structures such as the ribs, the first convex rib, the second convex rib, and the reinforcing rib, the contact area between the first connecting member and the second connecting member is increased, and the increased contact area can effectively and evenly disperse a shear force between the first connecting member and the second connecting member over the joining surfaces, so that a shear force withstood by a unit area of the joining surfaces is reduced, thereby prolonging the service life of the adhesive between the joining surfaces and increasing the shear force that the total area of the joining surfaces are able to withstand.

2. The concave-convex surfaces of the joint wall and the groove can effectively withstand stresses in various directions imposed on the crank arm from the drive end in a cyclic stepping process, so that most of the force between the first connecting member and the second connecting member can be vertically conducted through the joining surfaces of the joint wall and the groove, thereby reducing shear forces produced between the joining surfaces. In this way, slipping between the first connecting member and the second connecting member can be reduced effectively, and the fixing function is provided.

The above illustration is only the preferred embodiments of the present invention and is not provided to limit the implementation scope of the present invention. Simple equivalent changes and modifications made according to the appended claims of the present invention and content of description of the present invention all belong to the scope covered by the patent of the present invention.

What is claimed is:

1. A crank arm, comprising:
a first connecting member, having a first wall surface, one end of the first wall surface defined as a first pivot end and an opposite end of the first wall surface defined as a first drive end, the first pivot end being opened with a first axle hole therethrough, the first wall surface being provided with a joint wall; and
a second connecting member engaged with the first connecting member, the second connecting member being provided with a second wall surface opposite to the first wall surface, one end of the second wall surface defined as a second pivot end and an opposite end of the second wall surface defined as a second drive end, and the second wall surface being opened with a second axle hole for joining the first axle hole, and a groove being used for fitting the joint wall therein;
wherein, the joint wall and the groove have a continuous annular structure, and the wall surfaces of the joint wall and the groove are designed to be a wave shape for withstanding the shear force derived from the first connecting member and the second connecting member when these two connecting members are engaged.

2. The crank arm according to claim 1, wherein the wall surfaces of the joint wall and the groove have a serration shape.

3. The crank arm according to claim 1, wherein the wall surfaces of the joint wall and the groove have a square wave shape.

4. The crank arm according to claim 1, wherein the second wall surface has an annular wall extending toward the first connecting member, the annular wall is formed on the periphery of the second wall surface, inner sides of the annular wall are provided with two ribs, and the groove is formed between the annular wall and the two ribs.

5. The crank arm according to claim 4, wherein the first wall surface further comprises at least one reinforcing rib.

6. The crank arm according to claim 1, wherein the first wall surface is provided with a first axle seat, the first axle hole is opened at the center of the first axle seat, a partition is formed on the periphery of the first axle seat; the second pivot end is provided with a second axle seat, and the second axle hole is opened at the center of the second axle seat.

7. The crank arm according to claim 1, wherein the first drive end is provided with a first hole seat, a first assembly hole is provided at the center of the first hole seat, and the second drive end is provided with a second hole seat, the second hole seat engages with the first hole seat, and a second assembly hole is provided at the center of the second hole seat.

8. The crank arm according to claim 1, wherein the first wall surface is provided with at least two first convex ribs, the second wall surface is provided with at least one second convex rib, and during engagement for the crank arm, the first convex rib joins both wall surfaces of the second convex rib.

* * * * *